United States Patent [19]

Jenkner

[11] Patent Number: 4,736,511
[45] Date of Patent: Apr. 12, 1988

[54] SAWING AND DRILLING MACHINE

[76] Inventor: Erwin Jenkner, Lindenstrasse 13, Gechingen, Fed. Rep. of Germany, D-7261

[21] Appl. No.: 28,091

[22] Filed: Mar. 19, 1987

[30] Foreign Application Priority Data

Mar. 20, 1986 [DE] Fed. Rep. of Germany ....... 3609331

[51] Int. Cl.⁴ .......................... B23P 23/00; B27C 3/00
[52] U.S. Cl. ...................................... 29/560; 83/477.2; 144/35 R; 408/26
[58] Field of Search ..................... 29/560, 26 A, 26 R, 29/33 R; 408/26, 29, 37, 28, 22, 25; 83/477.2, 487, 488; 144/3 R, 35 R, 365, 367, 379

[56] References Cited

U.S. PATENT DOCUMENTS

| | | | |
|---|---|---|---|
| 3,481,028 | 12/1969 | Waters, Jr. | 29/560 |
| 3,483,904 | 12/1969 | Jacumin | 144/3 R |
| 3,832,083 | 8/1974 | Dockert et al. | 408/24 |
| 4,133,237 | 1/1979 | Lewin | 83/477.2 |
| 4,243,081 | 1/1981 | Pritelli | 144/35 R |
| 4,603,719 | 8/1986 | Durney | 29/33 R X |
| 4,607,555 | 8/1986 | Erhard | 83/477.2 |
| 4,632,165 | 12/1986 | Stegherr | 144/3 R X |
| 4,694,871 | 9/1987 | Jenkner | 408/26 |

FOREIGN PATENT DOCUMENTS

| | | | |
|---|---|---|---|
| 1728394 | 9/1972 | Fed. Rep. of Germany | 83/477.2 |
| 2748436 | 5/1979 | Fed. Rep. of Germany | 29/560 |

*Primary Examiner*—William R. Briggs
*Attorney, Agent, or Firm*—Dick and Harris

[57] ABSTRACT

In sawing and drilling machine for splitting up and drilling panel-type workpieces, a saw carriage and a drilling device for planar face and/or end face drilling are guided below a machine table having a saw slit, along a straight-line guide parallel to the saw slit.

To minimize the structural expenditure involved in guiding and driving the saw carriage and the drilling device, it is proposed that the drilling device be guidable along the straight-line guide of the saw carriage and that it be jointly adjustable with the saw carriage and that the saw slit be variable in its width.

6 Claims, 4 Drawing Sheets

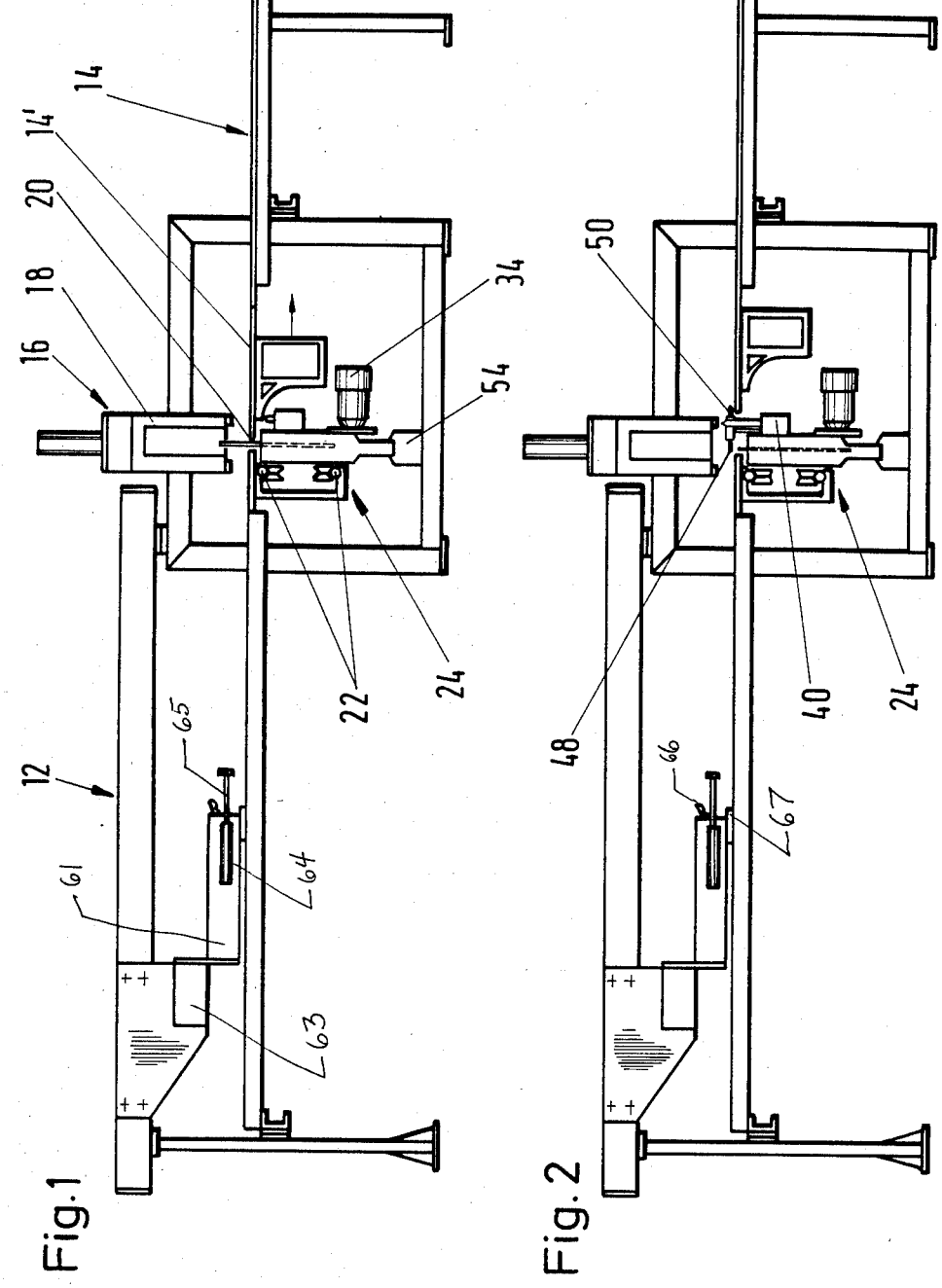

SAWING AND DRILLING MACHINE

BACKGROUND OF THE INVENTION

The invention relates to a sawing and drilling machine for splitting up and drilling panel-type workpieces comprising a machine table with a saw slit, a saw carriage displaceable along a straight-line guide below the machine tools, and a drilling device for planar face and/or end face drilling which is adjustable and lockable by a drive device parallel to the cutting plane throughout the entire length of cut.

A sawing and drilling machine of this kind has already been proposed in German Patent Application P No. 35 22 278.6.

It enables unfinished boards to be split up into a plurality of single-formatted board sections, where required, of different dimensions, and construction bores to be made in any preselectable number and position on their planar and/or end faces in a fully automatic manner.

Firstly, for example, all the body elements necessary for the construction of the body of a piece of furniture can be fully automatically cut to the required dimensions from an unfinished board and provided with all the bores needed for fixing and retaining pins. Secondly, elements for bodies of pieces of furniture of different size, i.e., dimensions can be manufactured successively without the necessity for manual adjustment of machine units.

In this sawing and drilling machine, the saw carriage and the drilling device are each horizontally adjustably guided on their own below the machine table along straight-line guides arranged next to each other, and the two units are separately drivable and actuatable.

The object of the present invention is to provide a sawing and drilling machine with the foregoing general features which is distinguished by less structural expenditure and simpler design.

This object is attained in accordance with the invention by the drilling device being adjustable along the straight-line guide of the saw carriage, and jointly with the saw carriage, and by the width of the saw slit being enlargeable for drilling.

In the inventive construction, the saw carriage and the drilling device, therefore, require only one common guide device and one common drive which is advantageously integrated into the saw carriage. The saw slit is correspondingly widened for drilling to enable the drill spindles to execute their advancing and setting motion in an upward direction for planar and/or end face drilling.

The saw carriage and the drilling device may constitute one structural unit, with the drilling device arranged in its entirety, for example, at one end face, or parts of the drilling device arranged in the area of both end faces of the saw carriage.

A further advantageous structural variant consists in providing of the drilling device as a structural unit which can be uncoupled from the saw carriage. The advantage of this embodiment is that the masses to be displaced in the splitting-up of unfinished boards are kept correspondingly small.

To widen the saw slit to enable operation of the drilling device, the machine table may, for example, comprise a section which can be swung down. In another construction, one edge of the saw slit is formed by an intermediate table section which is displaceable and lockable transversely to the longitudinal direction of the slit. In a preferred embodiment, the machine table is divided in the plane of the saw slit and one of the two table sections is adjustable and lockable transversely to the direction of cut.

These and other objects of the invention will become apparent in light of the present specification, drawings and claims.

SUMMARY OF THE INVENTION

The sawing and drilling machine for splitting up panel-type workpieces along a cutting plane and drilling those panel-type workpieces comprises a machine table with a saw slit. The saw carriage is displaceable along a straight-line guide below the machine table. A drilling device for planar face and/or end face drilling of the workpieces is also provided. The drilling device is adjustable and lockable by a drive device along the lines substantially parallel to the cutting plane throughout the entire length of the cut. The drilling device further is adjustable along the straight-line guide of the saw carriage. The drilling device is further jointly adjustable with the carriage. In addition, the machine table saw slit which is enlarged to accommodate drilling of the workpieces.

Furthermore, the above-described sawing and drilling machine can further be constructed so that the saw carriage and the drilling device form a single structural unit. In addition, the drilling device can comprise a structural unit which can be carried along with and uncoupled from the saw carriage. Also, parts of the drilling device can be provided at both end faces of the saw carriage. Furthermore, one edge of the saw slit is formed by an intermediate table section which is operably associated with the machine table in a displaceable and lockable manner transversely to the longitudinal direction of the saw slit. Furthermore, the machine table can be divided in the plane of the saw slit into two table sections wherein one of the two table sections is adjustable and lockable transversely to the direction of the cutting plate.

BRIEF DESCRIPTION OF THE DRAWINGS

An embodiment of an inventive sawing and drilling machine is illustrated schematically in the drawings, in which:

FIG. 1 is a side view of the machine, in which the machine is set up for panel splitting;

FIG. 2 is an illustration similar to FIG. 1 in which the machine is set up for drilling workpiece panels;

FIG. 6 is a front view of a machining unit comprised of a saw carriage and a drilling device, in which the drilling device can be uncoupled from the saw carriage.

DETAILED DESCRIPTION OF THE DRAWINGS

Figure 3:
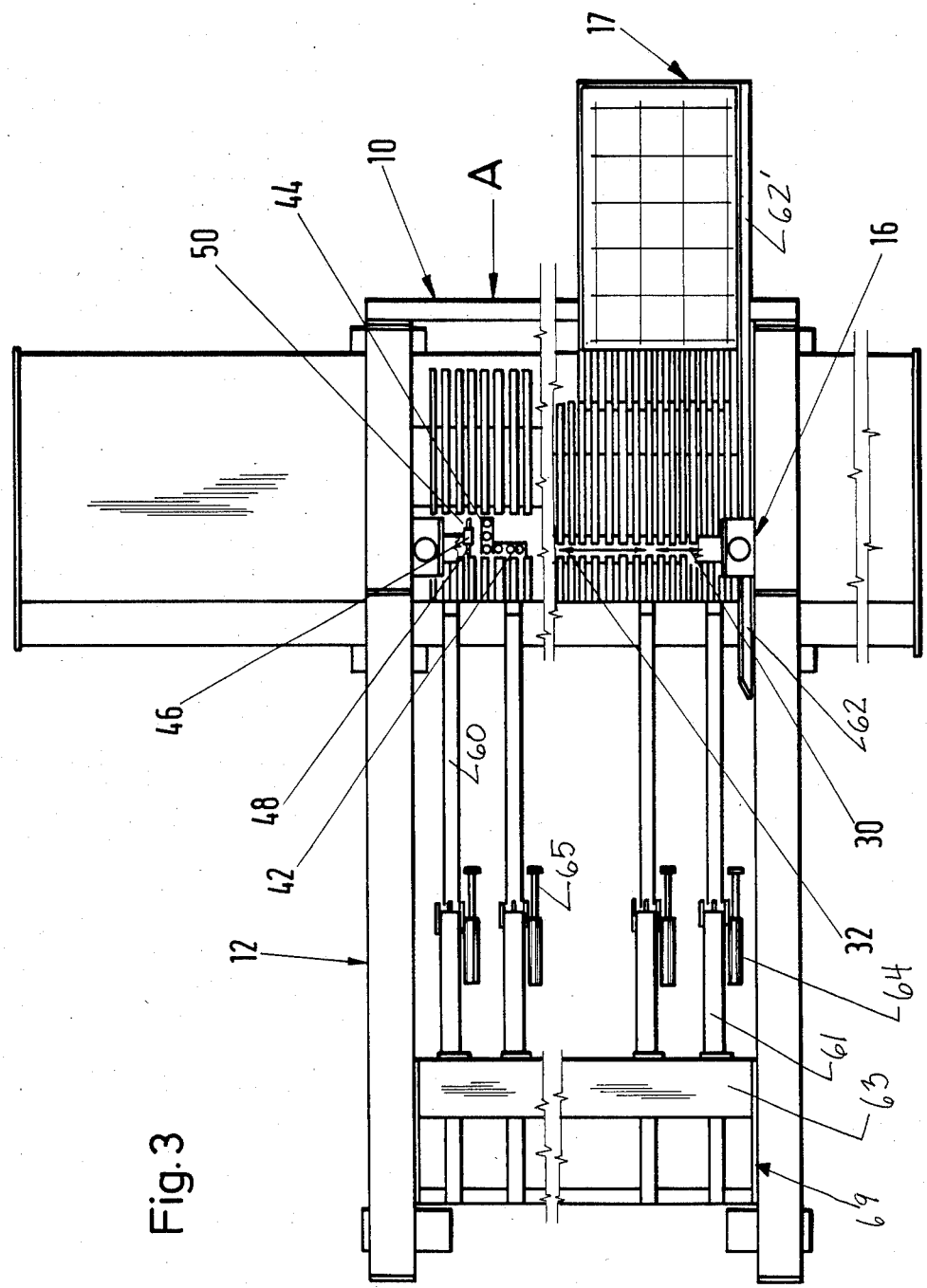
FIG. 3 is a plan view of the machine, in which the lower half of the machine is set up for sawing and the upper half of the machine for drilling.

The sawing and drilling machine illustrated in the drawings is comprised of a panel splitting saw 10 and a workpiece advancing device 12 of known design which is linked with the panel splitting saw 10. The latter comprises a workpiece supporting table 14 having arranged thereon a workpiece clamping device 16 which comprises, for example, a vertically movable and pneumatically actuatable press beam 18 for clamping on the workpiece supporting table 14, workpiece panels which are to be split up and drilled. This press beam is located above a saw slit 20 which is provided in the workpiece supporting table 14 and extends transversely to the direction of advance of the workpiece advancing device 12.

A machining unit designated in its entirety by reference numeral 24 is adjustable and lockably guided along a straight-line guide 22 beneath the saw slit 20. It is comprised of a saw carriage 26 and a drilling device 28 which are combined to form one structural unit. The saw carriage 26 is provided in the usual manner with a pre-score blade 30 and a saw blade 32 which are commonly mounted in the saw carriage so as to submerge and emerge. They are driven by an electric motor 34, while an electric motor 36 serves to transport the machining unit 24 along the straight-line guide 22 and to position it in preselectable positions.

The drilling device 28 is integrated into the saw carriage 26 and comprises, for example, two multiple-spindle drill heads 38 and 40, each exhibiting a row of vertical drill spindles 42 and 44, respectively. Construction bores can be made in the underside of panel-type workpieces or panel blanks with the aid of these drill spindles. To do so, the drill heads or the drill spindles are driven in an upward vertical direction, for example, penumatically.

Figure 5:
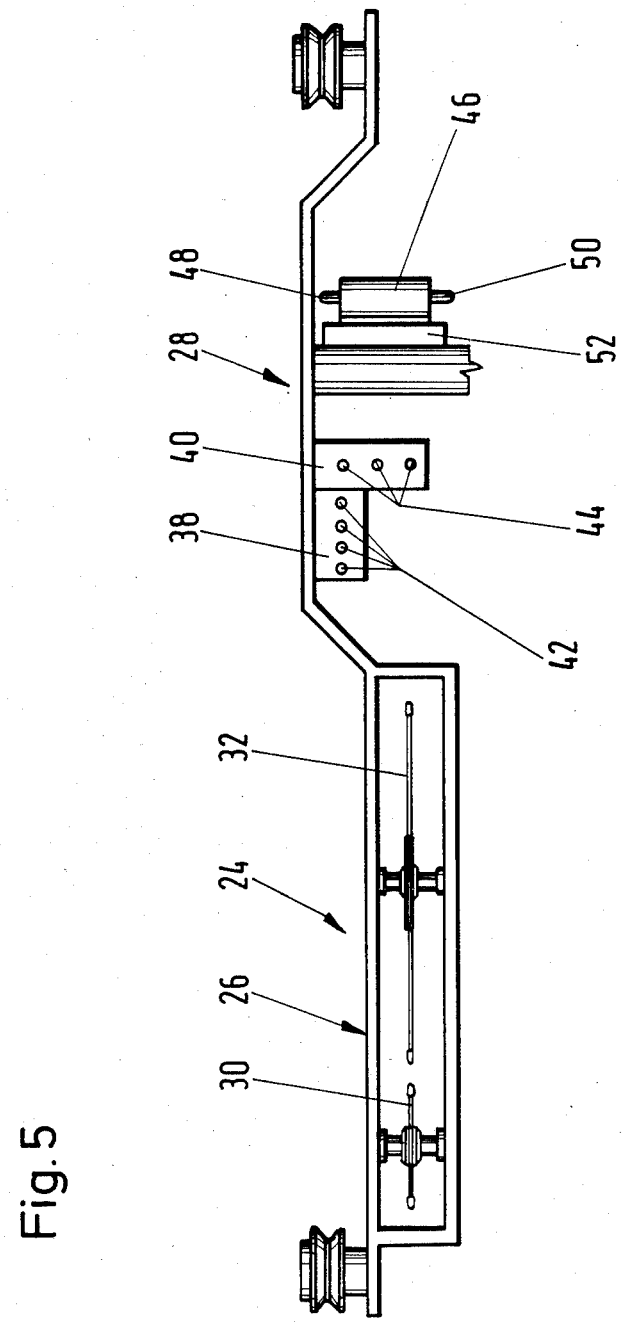
FIG. 5 is a plan view of the machining unit of FIG. 4.

A further drill head is designated by reference numeral 46. Its purpose is to make bores in end edges of workpieces. For this purpose, the drill head is provided with two preferably coaxially arranged drill spindles 48 and 50 which are horizontally mounted. Both drill spindles are advantageously jointly or separately drivable in the same or opposite direction of rotation. The drill head 46 is suitably arranged for adjustment on a carrier slide 52 both perpendicularly to the drawing plane of FIG. 5 and in directions perpendicular to one another in this drawing plane and thus transversely to the longitudinal extension of the saw slit 20 so that, as is apparent from FIG. 2, the drill head can be upwardly driven into a machining position to drill bores in workpiece end edges and can then be reciprocated in the axial direction of the spindles 48, 50 for execution of the drill advance.

If the drill head 46 is not required it may submerge into a position below the workpiece supporting table 14.

The drilling device may further comprise an assembly device, not illustrated, with which, for example, fittings can be automatically pressed into construction bores. It is, of course, also possible to provide several such assembly devices and, if required, further drill heads.

Operation of the drilling device 28 necessitates enlargement of the width of the saw slit 20. For this purpose, the workpiece supporting table 14 comprises, intermediate table section 14', which for operation of drilling device 28 is rightwardly displaceable in the direction of the arrows, from its covering position shown in FIG. 1 in which it covers the drilling device 28, and into a released position in accordance with FIG. 2, in order to effectively enlarge the width of saw slit 20 so that the drilling tools seated in the drilling spindles can emerge from the workpieces supporting plane of workpiece supporting table 14.

If, for example, unprocessed boards are only to be split up, the intermediate table section 14' is left in its covering position shown in FIG. 1 and the machining unit 24 is driven to and fro throughout the entire length of cut, with the pre-score and saw blades 30, 32 being extended into their machining position in the one direction of motion and retracted in the other direction of motion. The chips which accumulate are removed by suction via a suction channel 54. In this case, the drilling device 28 is operative without any function.

If unfinished panel-type workpieces are to be split up and bores are also to be drilled on the planar and/or end faces of the formatted workpiece panels obtained, the machining unit 24 is set in a program controlled manner at one or several predetermined machining positions, whereupon the intermediate table section 14' is adjusted, preferably automatically, to its released position and the tools of the drilling device 28 are then made to function.

Instead of the structural unit being comprised of the saw carriage 26 and the drilling device 28, the machining unit 24 may also comprise two machining components which can be uncoupled from each other so that if, for example, unprocessed boards are only to be split up, the saw carriage 26 can be made operative on its own. In this case, the driling device 28 shown in FIG. 6 also constitutes a carriage which is guided by rollers 56 along the straight-line guide 22 and can be coupled with the saw carriage 26 by a coupling 58 if single workpieces cut from an unprocessed board are to be simultaneously correspondingly drilled.

Figure 4:
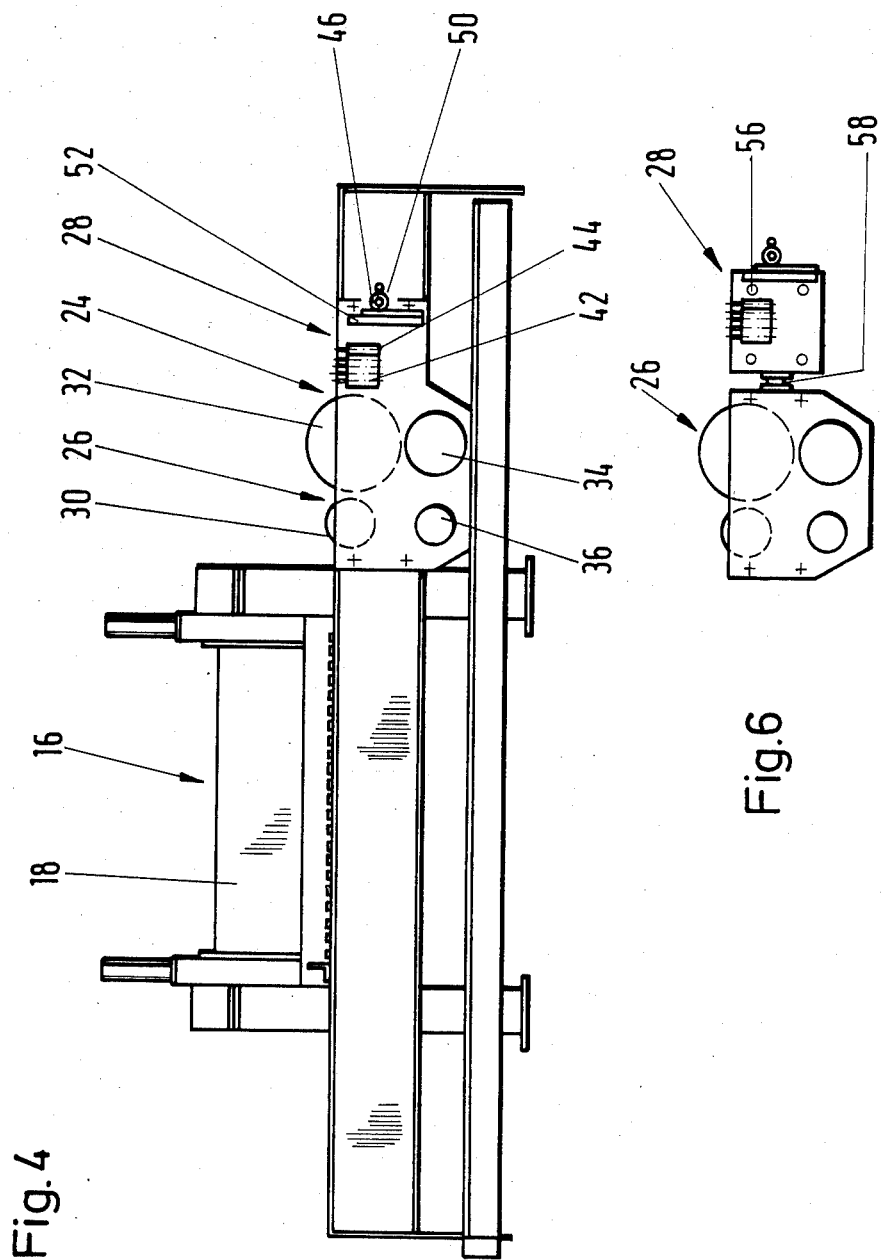
FIG. 4 is a view of the machine in the direction of arrow A of FIG. 3, in which the saw carriage combined with the drilling device to form a single machining unit is located in a lateral starting position, and both saw blades have emerged into the sawing position.

As is apparent from FIGS. 3 and 4, the length of the straight-line guide 22 is such that the drilling device 28 can be positioned throughout the entire width of the workpiece supporting table 14 at any desired position for performance of drilling and, if required, assembly operations.

Workpiece advancing device 12 is of a known construction. The workpiece advancing device 12 is connected to the rear longitudinal side of the workpiece support table 14 and comprises a plurality of parallel workpiece support strips 60 which are arranged in a common horizontal plane and extend perpendicularly to the saw slit 10. Cross bar 63 is located at distance above support strips 60. A plurality of preferably penumatically actuatable workpiece chucks 64 are arranged in laterally spaced relationship to one another, with their gripper legs 66 and 67 (FIG. 2) extending in the direction of the workpiece support table 14. Workpiece feed table 17 is provided in a known manner with side stop 62 and has a continuation 62' behind the saw slit 20. Associated with the side stop 62, above the workpiece support surface 14 is a transverse stop which is displaceable along a guide cross bar and with the aid of which workpieces placed on the workpiece feed table 17 may be placed against the side stop 62, 62'. In the non-operating position of the transverse stop, it is located in the area of the right end of the workpiece support table in a raised initial position.

Stop 65 is a stop that is horizontally extendable perpendicularly to the saw slit 20 from stop device 64 arranged on the side of the side stop 62, 62' on the cross bar 63 of the workpiece slide 69. An additional stop device 64 is preferably likewise located on the opposite side of cross bar 63. Further similar stops may also be arranged in the area between these two stop devices 64.

Stop devices 64 serve to align panel blanks which are to be split up or raw boards which are to be split up into panel blanks, before the first severing cut, relatively to the saw slit 20 for execution of a first trimming cut.

In operation, after the panel is placed on the table and made to abut the side stop 62, 62' with the aid of the transverse stop, the workpiece slide 69 is first driven in a program controlled manner towards the saw slit 20 and brought to a standstill at a predetermined distance from same. Stops 65 of stop devices 64 of the workpiece slide 69 are then extended and fix the end face of the board facing the chucks 61 at a predetermined distance from the saw slit 20. The board is then clamped with the aid of the press beam 18, prior to making a trimming cut. The workpiece is then released and pushed manually into chucks 61 of workpiece slide 69 until it abuts the stop. Clamping in the chucks is then carried out and worpiece slide 69 is driven back into its initial position for repeat of the foregoing alignment, clamping and cutting process.

The foregoing description and drawings merely explain and illustrate the invention and the invention is not limited thereto, except insofar as the appended claims are so limited, as those skilled in the art having the disclosure before them will be able to make modifications and variations therein without departing from the scope of the invention.

What is claimed is

1. A sawing and drilling machine for splitting up panel-type workpieces along a cutting plane and drilling said panel-type workpieces comprising:
   a machine table with a saw slit;
   a saw carriage displaceable along a straight-line guide below said machine table;
   a drilling device for planar face and/or end face drilling of said workpieces;
   said drilling device being adjustable and lockable by a drive device along a line substantially parallel to said cutting plane throughout the entire length of cut;
   said drilling device further being adjustable along said straight-line guide of said saw carriage;
   said drilling device further being jointly adjustable with said carriage; and,
   said machine table having a saw slit which is enlarged to accommodate drilling of said workpieces.

2. The apparatus as recited in claim 1, wherein said saw carriage and said drilling device form one structural unit.

3. The apparatus as recited in claim 1, wherein said drilling device comprises a structural unit which can be carried along with and uncoupled from said saw carriage.

4. The apparatus as recited in claim 1, wherein parts of said drilling device are provided at both end faces of said saw carriage.

5. The apparatus as recited in claim 1, wherein one edge of said saw slit is formed by an intermediate table section which is operatively associated with said machine table in a displaceable and lockable manner, transversely to the longitudinal direction of said saw slit.

6. The apparatus as recited in claim 1, wherein said machine table is divided in the plane of said saw slit into two table sections and one of said two table sections is adjustable and lockable transversely to the direction of said cutting plane.

* * * * *